(12) United States Patent
Watson et al.

(10) Patent No.: US 11,902,258 B2
(45) Date of Patent: Feb. 13, 2024

(54) PROTECTING CONTENT-STREAM PORTIONS FROM MODIFICATION OR REMOVAL

(71) Applicant: Amazon Technologies, Inc., Seattle, WA (US)

(72) Inventors: Ryan F. Watson, Seattle, WA (US); Craig Wesley Howard, Seattle, WA (US); Gregory Kenneth Truax, Portland, OR (US); Alex Xiaoye Zhang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 316 days.

(21) Appl. No.: 16/912,489

(22) Filed: Jun. 25, 2020

(65) Prior Publication Data
US 2020/0329019 A1 Oct. 15, 2020

Related U.S. Application Data

(63) Continuation of application No. 15/162,423, filed on May 23, 2016, now Pat. No. 10,701,040.

(51) Int. Cl.
*H04L 9/40* (2022.01)
*G06F 16/172* (2019.01)
(Continued)

(52) U.S. Cl.
CPC ........ *H04L 63/0428* (2013.01); *G06F 16/172* (2019.01); *G06F 16/182* (2019.01);
(Continued)

(58) Field of Classification Search
CPC ......... H04N 21/23116; H04N 21/2351; H04N 21/2393; H04N 21/2407; H04N 21/26258;
(Continued)

(56) References Cited

U.S. PATENT DOCUMENTS

| | | | |
|---|---|---|---|
| 10,701,040 B2 | 6/2020 | Watson et al. | |
| 2003/0005464 A1* | 1/2003 | Gropper | G16H 30/20 709/219 |

(Continued)

FOREIGN PATENT DOCUMENTS

| | | |
|---|---|---|
| CN | 105408881 A | 4/2018 |
| CN | ZL 201780032210 | 9/2021 |

(Continued)

OTHER PUBLICATIONS

International Search Report and Written Opinion for PCT/US17/33380 dated Aug. 11, 2017.
(Continued)

*Primary Examiner* — Michael H Hong
(74) *Attorney, Agent, or Firm* — Knobbe Martens Olson & Bear, LLP

(57) ABSTRACT

Systems and methods are described to enable delivery of streaming content while inhibiting or preventing removal, blocking, or skipping of portions within that streaming content. A content delivery system can generate a manifest indicating content portions that form the streaming content. Each content portion can be identified in the manifest using a concealed identifier, which conceals the actual identifier of the content portion from the client to inhibit or prevent the client from automatically removing or modifying the content portion. On receiving a request for a content portion, the content delivery system can convert the concealed identifier into the actual identifier, and return the appropriate content portion to the client. In some instances, the specific identifiers included within a concealed manifest may be modified or adapted based on monitoring information of the client device, to ensure clients view given portions of streaming content.

23 Claims, 7 Drawing Sheets

(51) Int. Cl.

| | | |
|---|---|---|
| G06F 16/182 | (2019.01) | |
| H04N 21/482 | (2011.01) | |
| H04N 21/231 | (2011.01) | |
| H04N 21/262 | (2011.01) | |
| G06F 21/64 | (2013.01) | |
| H04N 21/414 | (2011.01) | |
| H04N 21/845 | (2011.01) | |
| H04L 65/612 | (2022.01) | |
| H04L 65/75 | (2022.01) | |
| G06Q 30/0251 | (2023.01) | |
| H04L 67/06 | (2022.01) | |
| H04N 21/235 | (2011.01) | |
| H04N 21/239 | (2011.01) | |
| H04N 21/24 | (2011.01) | |
| H04N 21/81 | (2011.01) | |
| H04N 21/84 | (2011.01) | |
| H04L 65/80 | (2022.01) | |

(52) U.S. Cl.
CPC ......... *G06F 21/64* (2013.01); *G06Q 30/0267* (2013.01); *H04L 65/612* (2022.05); *H04L 65/762* (2022.05); *H04L 67/06* (2013.01); *H04N 21/2351* (2013.01); *H04N 21/2393* (2013.01); *H04N 21/23116* (2013.01); *H04N 21/2407* (2013.01); *H04N 21/26258* (2013.01); *H04N 21/41407* (2013.01); *H04N 21/4825* (2013.01); *H04N 21/812* (2013.01); *H04N 21/8126* (2013.01); *H04N 21/84* (2013.01); *H04N 21/8456* (2013.01); *G06F 2221/2107* (2013.01); *H04L 65/80* (2013.01)

(58) Field of Classification Search
CPC ......... H04N 21/41407; H04N 21/4825; H04N 21/812; H04N 21/8126; H04N 21/84; H04N 21/8456

See application file for complete search history.

(56) References Cited

U.S. PATENT DOCUMENTS

| | | | |
|---|---|---|---|
| 2003/0061278 | A1 | 3/2003 | Agarwalla et al. |
| 2004/0148399 | A1 | 7/2004 | Fenizia et al. |
| 2006/0106802 | A1 | 5/2006 | Giblin et al. |
| 2010/0058061 | A1* | 3/2010 | Folta ............... G06F 21/14 713/171 |
| 2012/0210382 | A1 | 8/2012 | Walker et al. |
| 2014/0040026 | A1* | 2/2014 | Swaminathan ..... G06Q 30/00 705/14.66 |
| 2014/0091251 | A1 | 4/2014 | Zhao et al. |
| 2014/0150019 | A1 | 5/2014 | Ma et al. |
| 2014/0156800 | A1 | 6/2014 | Falvo |
| 2014/0208104 | A1* | 7/2014 | Yoon ............... H04L 9/3247 713/168 |
| 2014/0372624 | A1 | 12/2014 | Wang et al. |
| 2015/0059156 | A1 | 3/2015 | Diehl et al. |
| 2015/0227757 | A1* | 8/2015 | Bestler ............. G06F 3/067 713/167 |
| 2015/0256583 | A1 | 9/2015 | Rosenzweig et al. |
| 2015/0334431 | A1 | 11/2015 | Bjordammen et al. |
| 2016/0127440 | A1 | 5/2016 | Gordon |
| 2016/0277406 | A1* | 9/2016 | Halligan ........... H04L 63/0407 |
| 2016/0337680 | A1* | 11/2016 | Kalagi ............. H04N 21/23439 |
| 2017/0085933 | A1* | 3/2017 | Czeck, Jr. ......... H04N 21/812 |
| 2017/0091251 | A1 | 3/2017 | Wood et al. |
| 2017/0339114 | A1 | 11/2017 | Watson et al. |

FOREIGN PATENT DOCUMENTS

| | | |
|---|---|---|
| DE | 112017002625 T5 | 4/2019 |
| JP | 2014-194624 A | 10/2014 |
| JP | 6666520 | 2/2020 |
| WO | WO 2017/205185 A1 | 11/2017 |

OTHER PUBLICATIONS

International Preliminary Report on Patentability for PCT/US17/033380 dated Nov. 27, 2018.

\* cited by examiner

PROTECTING CONTENT-STREAM PORTIONS FROM MODIFICATION OR REMOVAL

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

Service providers or content creators (such as businesses, artists, media distribution services, etc.) can employ a series of interconnected data centers to deliver content (such as web sites, web content, or other digital data) to users or clients. These interconnected data centers are sometimes referred to as "content delivery networks" (CDNs) or streaming content delivery systems. Existing routing and addressing technologies can enable multiple data centers associated with a streaming content delivery system to provide similar or identical content to client computing devices. In some instances, each data center providing a set of content may be referred to as a point-of-presence ("POP"). A streaming content delivery system can maintain POPs over a wide area (or worldwide) to enable the system to efficiently service requests from clients in a variety of locations.

CDNs can be utilized to distribute wide varieties of content, and in some instances may serve to replicate or replace prior content distribution systems. For example, CDNs can provide network-based streaming audio or video content in a manner similar to traditional television or radio networks. This content is sometimes referred to as "internet television" or "internet radio," respectively. The streaming content can typically be viewed by dedicated computing devices (e.g., set top boxes), dedicated viewers on client computing devices (e.g., software applications), or non-dedicated software applications (e.g., web browsers). Often, these viewers provide functionality greater than the functionality available on traditional distribution networks, like television or radio, such as the availability to play content "on-demand." Moreover, these viewers are often provide a high level of control to an end user, enabling the user to modify viewed content, such as to remove advertisements or other undesirable portions, often without the knowledge of the content provider or distribution network. In some instances, these modifications cause false information to be provided to content providers, such as an indication that an advertisement was viewed when in fact it was blocked.

DETAILED DESCRIPTION

Figure 1:
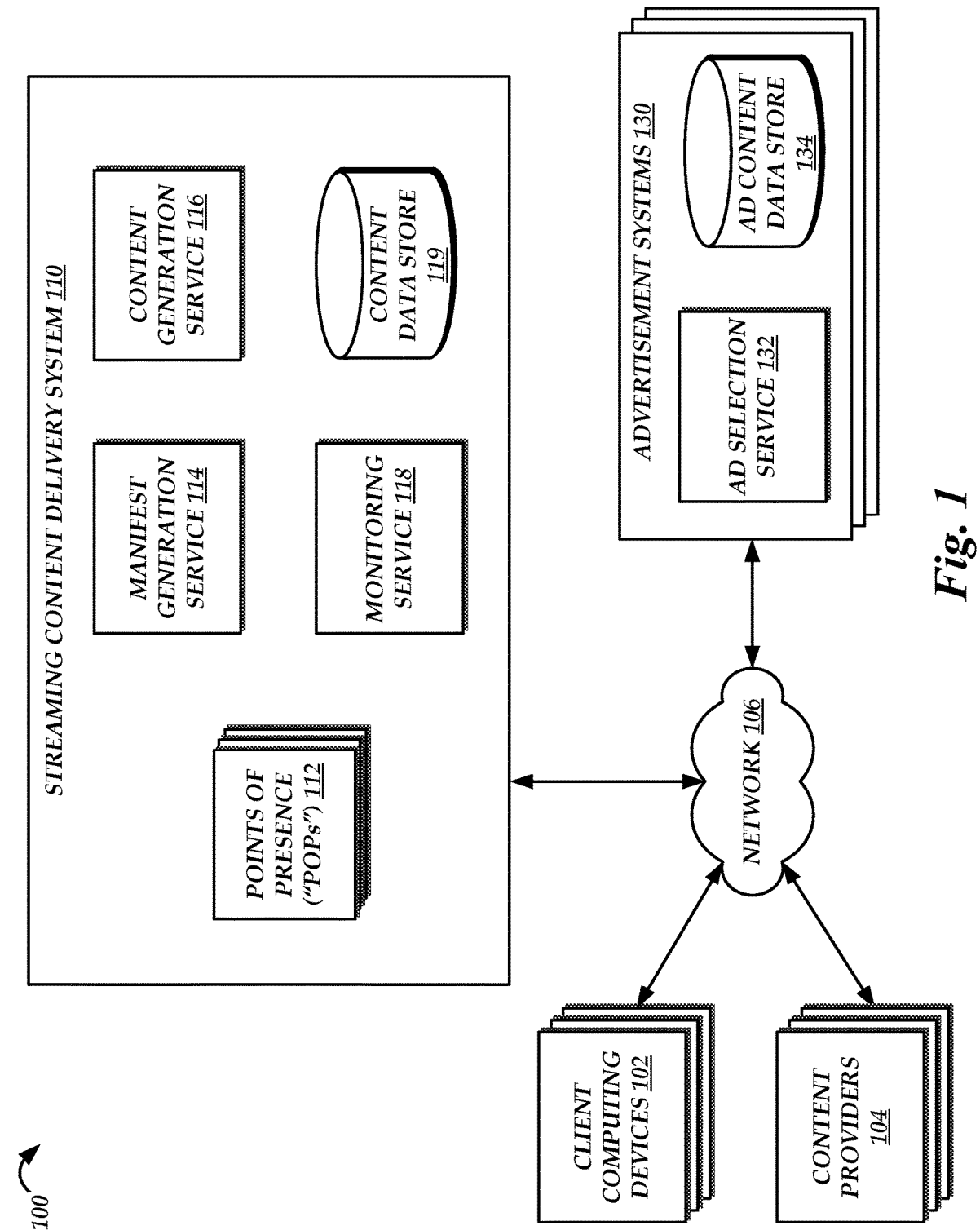
FIG. 1 is a block diagram depicting an illustrative logical network environment including client computing devices, content providers, and advertisement systems, as well as a streaming content delivery system configured to provide content with protected portions to the client computing devices by use of concealed manifests, which inhibit removal or blocking of the protected portions.

Generally described, the present disclosure relates to providing streaming content over a communication network in manner that inhibits clients or client computing devices from blocking or altering protected portions of the content, and that may ensure that clients view the protected portions. As described herein, streaming content generally refers to any content that is divided into portions (sometimes referred to as "chunks") that may be transmitted and viewed independently, such that a client may begin to watch a first portion while downloading a second. The various portions of streaming content are often identified within one or more manifests, which provide metadata regarding the streaming content as well as a list of portions within the content. Each portion may be identified within the manifest based on a resource identifier (such as a uniform resource indicator, or "URI") or file name, which a client computing device may use to obtain and output the portions. In some instances, client computing devices may utilize the resource indicators of portions to selectively block or filter unwanted content, such as legal warning and notifications, credits, dedications, or advertisements. Devices or software that block such content are sometimes referred to as "ad blockers." Ad blockers often function by monitoring manifests for portions with specific resource indicators (such as those including certain words within a file name or indicating certain domain names within an identifier), and either removing those portions from the manifest file or otherwise preventing the client computing device from displaying the portion. These modifications prevent clients from viewing important content and can have a detrimental effect on content providers (e.g., by reducing the effectiveness of legal warnings, reducing advertising revenue of the content provider, etc.). Accordingly, embodiments of the present disclosure relate to a streaming content delivery system that generates and transmits concealed manifests for streaming content, which list portions of the content via concealed identifiers that mask the nature of the individual portions listed in the manifest. The concealed manifests may be created "just-in-time" (e.g., in response to a client request) and may be individualized to each client or to each streaming session (e.g., each discrete instance in which streaming content is consumed), thus preventing ad blockers from identifying which portions contain advertisements (or other content that a client may wish to block) and which portions contain other content. When individual portions from the concealed manifest are requested by a client computing device, the streaming content delivery system can convert a concealed identifier of the portion into an actual (e.g., not concealed) identifier for the portion, and return the portion to the client. In this manner, a client computing device may be prevented from distinguishing between the different portions in a manifest, and thus prevented from altering the content to remove specific portions.

As an illustrative example, assume a client computing device requests streaming content from the streaming content delivery system, which includes twenty five minutes of television programming and three minutes of an advertisement. A typical manifest file may identify each portion of the television programming in discrete 10 second portions according to a first naming scheme or convention (e.g., "television1.ts," "television2.ts," etc.), and may similarly identify each 10 second portion of the advertisement according to a second naming scheme or convention ("advertisement1.ts," advertisement2.ts,"), etc. Under normal operation, a client computing device would retrieve each portion using the identifier in the manifest, which can correspond to a network file location (e.g., a URI). However, if a client computing device utilized an ad blocker, it would be relatively trivial for the client computing device to modify the manifest file to remove the advertisement, by removing all references to files named under the second naming convention (e.g., entitled "advertisementX.ts"). In accordance with aspects of the present disclosure, a streaming content delivery system may, instead of providing the actual identifiers of each portion within a manifest (e.g., a network location at which a portion is stored), provide a series of concealed identifiers within the manifest that utilize a common naming convention. Each concealed identifier can be generated such that the nature of the corresponding content portion is withheld from the client computing device (e.g., such that both the television programming and the advertisement are represented by a common naming scheme). When a portion is requested using a concealed identifier, the streaming content delivery system can convert the concealed identifier into the actual identifier, and provide the correct content portion to the client. Thus, client computing device may be enabled to stream content, but prevented from automatically blocking or altering portions of the content based on identifiers within a manifest file.

Advantageously, the use of a concealed manifest, identifying content portions by use of concealed identifiers, can enable a streaming content delivery system to modify identifiers of content portions on a per-session or per-user basis, reducing or eliminating the possibility that client computing devices (e.g., via ad blocker software) can predict the content within each content portion. Moreover, because the streaming content delivery system can convert concealed identifiers to actual (e.g., non-concealed) identifiers, the system is not required to replicate the actual content portions themselves, which could significantly increase the storage requirements of the streaming content delivery system and interfere with caching of those content portions within the system. In addition, because manifests can be generated on a per-client basis, the specific portions provided within each manifest can be varied based on the attributes of the user (e.g., to provide targeted advertisements within the portions).

To enable the generation of concealed manifests, the streaming content delivery system can include a manifest generation service, which receives client requests for streaming content and returns a manifest including concealed identifiers of portions of that content. In some instances, the manifest generation service may interact with third party services, such as advertisements networks, to determine the specific streaming content to be provided to each client (e.g., a main content item in addition to one or more advertisements, legal notifications, etc.). Thereafter, the manifest generation service can generate a concealed manifest for the streaming content, which utilizes concealed identifiers for each portion of the content. In one embodiment, the manifest generation service may determine a concealed identifier for a given content portion by encrypting an actual identifier of the content portion according to any of a variety of encryption techniques that are known in the art. Thus, a human-recognizable identifier (such as "advertisement.ts") may be converted into a non-human-recognizable identifier, which can be included within a concealed manifest. In another embodiment, the manifest generation service may determine a concealed identifier for a given content portion by random selection, or by passing the actual identifier through a one-way hash algorithm. Generally, the concealed identifiers provided to a client are not required to be unique, as the streaming content delivery system can maintain a record of the concealed identifiers provided to a client and the corresponding actual identifiers, or a record of how the concealed identifiers for each client were created. However, it may be desirable to configure the streaming content delivery system such that concealed identifiers are unique (e.g., statistically very unlikely to be duplicated), in order to reduce the need to maintain state information between various components of the streaming content delivery system. For example, where all concealed identifiers are created by encrypting actual identifiers using a common encryption key, any component of the streaming content delivery system may convert a concealed identifier into an actual identifier using that encryption key, without requiring other information to be maintained between the components. Use of a common encryption key to convert actual identifiers to concealed identifiers may therefore be desirable in widely distributed systems, such as embodiments where the manifest generation service is implemented separately from components that actually provide content portions to client computing devices.

In some instances, content within individual portions may further be concealed by re-encoding or otherwise modifying the various portions to maintain constant attributes. For example, when streaming content includes two types of content (e.g., both main content and advertising content) that are generally provided in 10 second increments, it is likely that one or both of the content types are of a length not evenly divisible into 10 second increments. While portions are not necessarily required to maintain constant duration, variance in that duration could be used by a client computing device to distinguish between types of content (e.g., where a portion is of a different duration than the surrounding portions, it likely indicates a transition between types of content). Similarly, different types of content may have different attributes, such as encoding type, bitrate, resolution, frame rate, codec, codec profile, codec level, channel count, etc., that may also be used to distinguish between the types. To inhibit distinguishing between content types, the streaming content delivery system may include a content generation service configured to re-encode content, such that portions that would otherwise vary within a stream can be made to have uniform attributes. For example, where a first type of content (e.g., main content) would normally be provided in a portion of non-standard duration and followed by a second type of content (e.g., advertising content), the content generation service can re-encode the first and second types of content to create one or more portions of standard duration (each of which may include a combination of the first and second types of content). As a further example, where a first type of content and a second type of content vary in other attributes, such as encoding type, bitrate, resolution, frame rate, codec, codec profile, codec level, channel count, etc., the content generation system may re-encode either or both the first and second types of content to unify the attributes of the content types. As yet another example, where one or more types of content are associated with supplemental content (e.g., audio or subtitles supplementing video content), the content generating system may also re-encode the supplemental content to ensure consistency in the attributes of the supplemental content. As will be described in more detail below, the content generation service may in some instances operate in a just-in-time manner, by generating required content portions only after they are identified to a client computing device (e.g., within a concealed manifest).

In addition to automatic content filtering or blocking (e.g., by use of ad blockers), embodiments of the present disclosure can inhibit or prevent manual skipping of content by clients. Specifically, embodiments of the present disclosure can utilize adaptive manifests, whose contents vary based on activities of the client consuming the manifest. For example, rather than being provided in total at the beginning of a streaming session, a manifest can be provided to a client over the course of the streaming session (e.g., in a single constantly updated file, in multiple files, etc.). The streaming content delivery system can then be configured to vary the contents of later sections of the manifest file based on user activity during a streaming session. For example, where a first section of a manifest includes an advertisement, but that advertisement is not output by a client (e.g., because the client skipped over a section of the content corresponding to the advertisement), the streaming content delivery system can generate a subsequent section of the manifest to re-introduce the advertisement. In this manner, the specific content portions included within each section of the manifest can be customized based on the activity of the client computing device.

While examples are provided herein with respect to content distribution systems, embodiments of the present disclosure may be implemented with respect to any network of computing devices that operates to serve streaming content to client computing devices. Moreover, while some examples are provided with respect to specific types of streaming content, such as audio and video, embodiments of the present disclosure may be utilized to control delivery of any content divided into discrete sections that are identified to a user by a manifest. Still further, while some examples are provided with respect to controlling additional content included within a content stream (e.g., advertisements, disclaimers, credits, etc.), embodiments of the present disclosure may be utilized to control how any content is included within a content stream. For example, some content may be associated with restrictions that limit who may view the content or how the content may be viewed (e.g., such that viewing is limited to specific time periods or geographic locations). Embodiments of the present disclosure may utilize concealed manifests that, although can be viewed by clients, prevent clients from identifying specific content associated with restrictions (e.g., by recognizing file names of restricted content) because identifiers can be obfuscated, and may further generate custom manifests for clients (e.g., to include or exclude restricted content) based on information gathered regarding the client (e.g., including monitoring information or other data). Thus, the examples provided herein are intended to be illustrative, and not exhaustive, in nature.

As will be appreciated by one of skill in the art in light of the description above, the embodiments disclosed herein substantially increase the ability of computing systems, such as streaming content delivery systems, to deliver content to users in a protected manner, such that client devices are inhibited or prevented from modifying the output of one or more protected portions. Thus, the presently disclosed embodiments represent an improvement in the functioning of such computing systems, by enabling streaming content delivery systems or other networked devices to replicate and reproduce functionality provided by traditional distribution networks, such as television and radio networks. Moreover, the presently disclosed embodiments address technical problems inherent within computing systems; specifically, the limited control that network transmission systems have of data after transmission to a client computing device, and the high potential for client devices to modify that content in an undesirable way. These technical problems are addressed by the various technical solutions described herein, including the use of concealed manifest files that conceal the content types within various content portions, and the use of adaptive manifest files whose contents can be varied based on client behavior. Thus, the present disclosure represents a substantial improvement on existing network systems and computing systems in general.

The foregoing aspects and many of the attendant advantages of the present disclosure will become more readily appreciated as the same become better understood by reference to the following, when taken in conjunction with the accompanying drawings.

FIG. 1 is a block diagram depicting an illustrative logical network environment 100 including multiple client computing devices 102, content providers 104, and advertisement systems 130 in communication with a streaming content delivery system 110 via a network 106. While the client computing devices 102, the content providers 104, and the advertisement systems 130 are shown as grouped within FIG. 1, the client computing devices 102, content providers 104, and advertisement systems 130 may be geographically distant, and independently owned or operated. For example, the client computing devices 102 could represent a multitude of users in various global, continental, or regional locations accessing the streaming content delivery system 110. Further, the content providers 104 could represent a multitude of related or distinct parties that have associated with the streaming content delivery system 110 to provide content, such as web sites, multimedia, or other digital, network-deliverable content to the client computing devices 102. Still further, the advertisement systems 130 could represent a multitude of related or distinct parties provided advertising content to be included within content associated with the content providers (e.g., and providing revenue to the content providers). While shown as distinct, the client computing devices, content providers 104, or advertisement systems 130 may be operated by a common entity, or by a common computing device. Accordingly, the groupings of client computing devices 102, content providers 104, and advertisement system 130 within FIG. 1 is intended to represent a logical, rather than physical, grouping. Similarly, each of the components of the streaming content delivery system 110 may be located within geographically diverse areas. For example, the streaming content delivery system 110 can contain POPs 112 at a variety of globally, continentally, or regionally distinct locations, in order to provide a wide geographical presence for the streaming content delivery system 110.

Network 106 may be any wired network, wireless network, or combination thereof. In addition, the network 106 may be a personal area network, local area network, wide area network, cable network, satellite network, cellular telephone network, or combination thereof. In the example environment of FIG. 1, network 106 is a global area network (GAN), such as the Internet. Protocols and components for communicating via the other aforementioned types of communication networks are well known to those skilled in the art of computer communications and thus, need not be described in more detail herein. While each of the client computing devices 102, content providers 104, advertisement systems 130, and streaming content delivery system 110 is depicted as having a single connection to the network 106, individual components of the client computing devices 102, content providers 104, advertisement systems 130, and streaming content delivery system 110 may be connected to the network 106 at disparate points. Accordingly, communication times and capabilities may vary between the components of FIG. 1.

Client computing devices 102 may include any number of different computing devices capable of communicating with the streaming content delivery system 110. For example, individual client computing devices 102 may correspond to a laptop or tablet computer, personal computer, wearable computer, server, personal digital assistant (PDA), hybrid PDA/mobile phone, mobile phone, electronic book reader, set-top box, camera, digital media player, and the like. Each client computing device 102 may include hardware and/or software enabling the reception and output of streaming content, including dedicated playback hardware, dedicated software (e.g., specially programmed applications), and general purpose software (e.g., web browsers) capable of outputting streaming content (e.g., by downloading the content directly, downloading a web page including the content, etc.). In some instances, client computing devices 102 may further be configured to report information regarding output of content to the streaming content delivery system 110, such as whether specific portions of content were output by the client computing device. The specific configuration of individual client computing devices 102 may vary. For example, most client computing devices 102 may retrieve and output streaming content without modification; however, some client computing devices 102 may include hardware or software configured to modify streaming content to remove specific portions (e.g., legal warnings, credits, dedications, advertisements, etc.).

Content providers 104 may include any computing device owned or operated by an entity that provides content to the streaming content delivery system 110 for subsequent transmission to client computing devices (which may include one or more client computing devices 102). For example, content providers 104 may include servers hosting streaming audio, video, text, multimedia, or interactive services (e.g., video games, virtual or augmented reality content, or other immersive content). While illustratively shown in FIG. 1 as a network-attached computing device, content providers 104 may additionally or alternatively provide content to the streaming content delivery system 110 via non-networked communication channels (e.g., via physical delivery of data).

Advertisement systems 130 can include any computing device owned or operated by an entity that provides advertising content to the streaming content delivery system 110 for inclusion within other content (e.g., streaming video). Advertising may include pictures, text, audio, video, or any other content to be inserted within other content types provided by the streaming content delivery system 110. Illustratively, the advertising may be stored by the advertisement systems 130 within the ad content data store 134, which may correspond to any persistent or substantially persistent data storage, such as a hard drive (HDD), a solid state drive (SDD), network attached storage (NAS), a tape drive, or any combination thereof. In some instances, the advertisement systems 130 may be configured to select the specific advertisements to be included within streaming content provided by the streaming content delivery system 110 (e.g., based on attributes of a client computing device). Accordingly, the advertisement systems 130 may include an ad selection service 132 configured to receive information regarding content to be streamed to a client computing device (e.g., including attributes of the client computing device itself) and to return a selection of advertising to be included within the streaming content. In one embodiment, the streaming content delivery system 110 and the ad selection service 132 may communicate by use of a standard protocol or specification, such as the Video Ad Serving Template (VAST) specification provided by the INTERACTIVE ADVERTISING BUREAU™ ("IAB"), which enables a streaming content service to transmit information regarding streaming content and to receive, from the advertisement system 130, information regarding what advertising should be played, how the advertising should be played, and what information should be tracked. The operation of advertisement systems 130, including ad selection services 132, is generally known within the art and thus will not be described in detail herein. While illustrative embodiments are described with regard to distinct advertisement systems 130 that select advertisements for including in content streams, the streaming content delivery system 110 may additionally or alternatively operate without interaction with advertisement systems 130 (e.g., by integrating an ad selection service 132 into the streaming content delivery system 110, by selecting advertising based on a set of rules, by providing static advertising, by integrating non-advertising content as protected content, etc.).

The streaming content delivery system 110 can include a variety of components and devices configured to enable client computing devices 102 to access streaming content provided to the streaming content delivery system 110 by the content providers 104 and the advertisement systems 130. Specifically, the streaming content delivery system 110 can include a number of POPs 112 configured to host streaming content, or act as a caching point for streaming content hosted by the streaming content delivery system 110, the content providers 104, and/or the advertisement systems 130. Each POP 112 may include a variety of computing devices configured to serve content to client computing devices 102. Accordingly, though not shown in FIG. 1, each POP 112 may include any number of processors, data stores, or networking components operating in conjunction to facilitate retrieval and delivery of streaming content to client computing devices. The POPs 112 may communicate with other components of the streaming content delivery system 110 via an internal network of that system 110, which may include any wired network, wireless network, or combination thereof, and may be a personal area network, local area network, wide area network, cable network, satellite network, cellular telephone network, or combination thereof. In some instances, the internal network may be implemented at least in part by the network 106 (e.g., as a virtual private network, or "VPN"). Illustratively, each POP 112 may function to hold a limited selection of content portions within a local cache data store (e.g., the mostly recently requested n content portions), such that these content portions can be quickly transmitted to client computing devices 102. When the local cache data store does not include a requested content portion, the POP 112 can be configured to retrieve the content portion from a remote data store, such as a content data store 119 of the streaming content delivery system 110, the ad content data store 134, or a data store within a system of a content provider 104 (not show in FIG. 1), and return the content portion to a requesting client computing device 102.

In accordance with embodiments of the present disclosure, the streaming content delivery system 110 can include a manifest generation service 114 configured to respond to client requests for streaming content, and to generate a concealed manifest that identifies, via concealed identifiers, a number of content portions to be provided to a requesting client computing device 102. Because the concealed manifest utilizes concealed identifiers for the content portions, client computing devices 102 can be prevented from distinguishing between the types of content within each portion, and thus inhibited or prevented from automatically blocking specific types of content. As will be described in more detail below, the manifest generation service 114 may interact with other components of the streaming content delivery system 110 as well as external components, such as the advertisement systems 130, to select the specific content portions to be identified within the manifest. The manifest generation system 114 can further communicate with a content generation service 116 to ensure that any custom content portions identified within the manifest are available on the streaming content delivery system 110. In some instances, the manifest generation system 114 may vary the content portions included within a manifest based on activity of the client computing device 102, to inhibit or prevent manual skipping of protected content, such as advertisements provided by the advertisement systems 130. Moreover, the manifest generation service 114 can communicate information to other components of the streaming content delivery system 110, such as the POPs 112, that enable such components to convert concealed identifiers, as included within the concealed manifest, into the actual identifiers for content portions, and thus enable those components to retrieve and provide the content portions to the client computing devices 102

The streaming content delivery system 110 can further include a content generation service 116 configured to generate content portions to be identified within a concealed manifest, or to join, split, or modify existing content portions such that all content portions within the concealed manifest share the same or similar attributes (e.g., the same length, resolution, bitrate, frame rate, etc.). Illustratively, the content generation service 116 may be configured to receive notifications from the manifest generation service 114 indicating one or more content portions identified within a concealed manifest and the desired parameters of those content portions, and then to re-encode existing content (e.g., existing main content, advertisements, etc.) to conform to those desired parameters. The content generation service 116 may then store the generated portions (e.g., within the content data store 119) to make those portions available to the client computing device 102 that received the concealed manifest, to the POPs 112, or to other components of the streaming content delivery system 110. In some instances, the content generation service 116 can function in a "just-in-time" manner, such that content portions are generated simultaneously with or after delivery of a concealed manifest to a client computing device 102.

The content data store 119, which may be utilized to store the generated content portions as well as other content (e.g., as provided by the content providers 104, the advertisement systems 130, etc.) can correspond to any persistent or substantially persistent data storage, such as a hard drive (HDD), a solid state drive (SDD), network attached storage (NAS), a tape drive, or any combination thereof.

The streaming content delivery system 110 can further include a monitoring service configured to receive information regarding transmission of content portions to client computing devices 112 or output of those content portions on the client computing devices 102. In some instances, POPs 112 may transmit information to the monitoring service 118 indicating that a specific content portion has been requested and delivered to a client computing device 102, which may indicate that the client computing device 102 has viewed (or at least has possibly viewed) the content portion. Further, client computing devices 102 themselves may transmit information to the monitoring service 118 indicating that specific content portions have been received or output to a user. In some instances, the client computing device 102 may provide monitoring information by executing code provided by the streaming content delivery system 110, such as JAVASCRIPT™ code included within a web page that outputs streaming content. As will be described in more detail below, the monitoring information gathered at the monitoring service 118 may in some instances be utilized by the manifest generation service 114 to generate or adapt the content portions identified within concealed manifests.

It will be appreciated by those skilled in the art that the streaming content delivery system 110 may have fewer or greater components than are illustrated in FIG. 1. In addition, the streaming content delivery system 110 could include various web services and/or peer-to-peer network configurations. Thus, the depiction of the streaming content delivery system 110 in FIG. 1 should be taken as illustrative. For example, in some embodiments, components of the streaming content delivery system 110, such as the manifest generation service 114 or the content generation service 116, may be executed by one more virtual machines implemented in a hosted computing environment. A hosted computing environment may include one or more rapidly provisioned and released computing resources, which computing resources may include computing, networking and/or storage devices. A hosted computing environment may also be referred to as a cloud computing environment.

Figure 2:
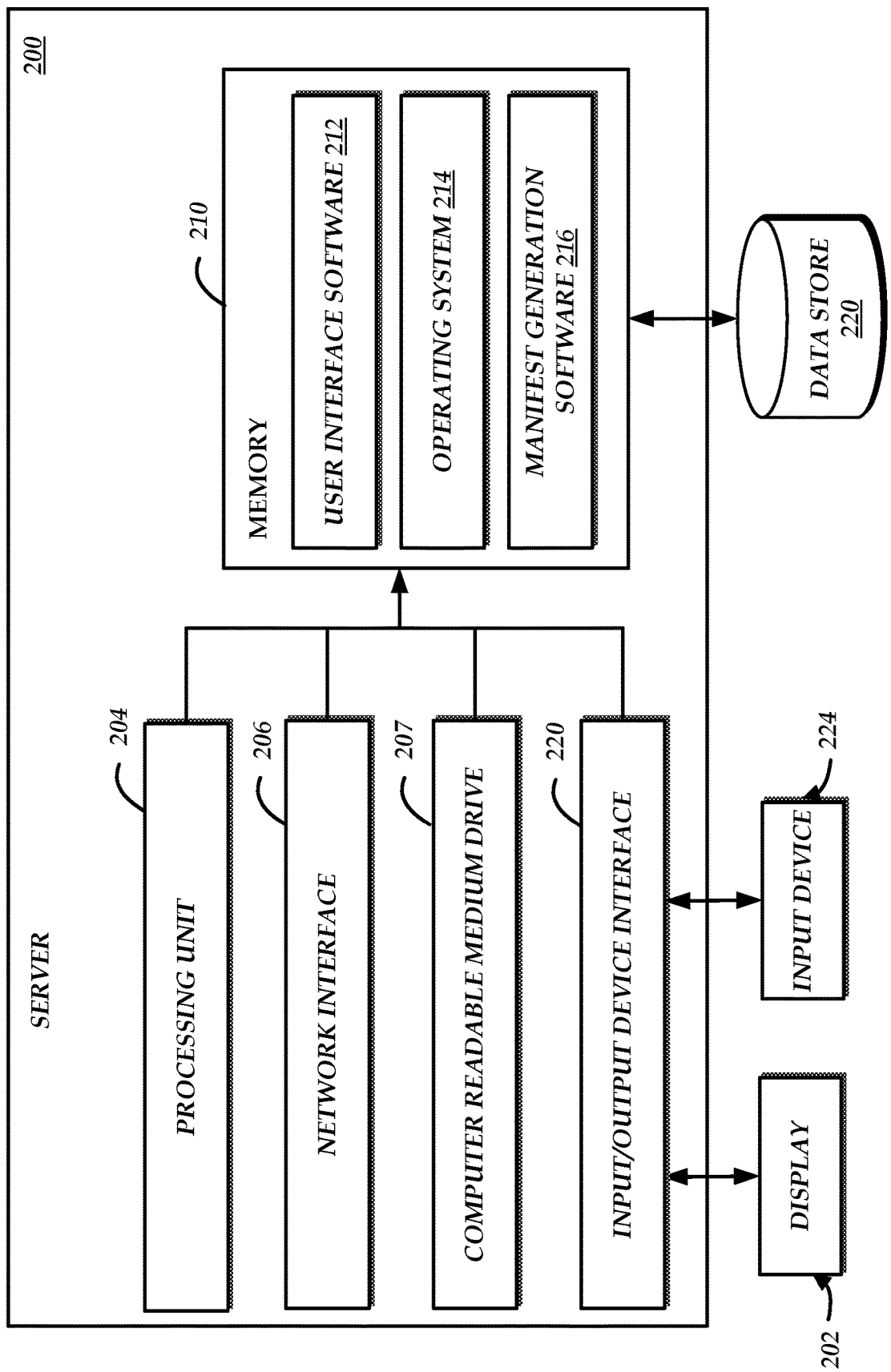
FIG. 2 is a block diagram depicting an illustrative configuration of one embodiment of a server than may implement the manifest generation service of FIG. 1, which may generate concealed manifests.

FIG. 2 depicts one embodiment of an architecture of a server 200 that may implement the manifest generation service 114 described herein. The general architecture of server 200 depicted in FIG. 2 includes an arrangement of computer hardware and software components that may be used to implement aspects of the present disclosure. As illustrated, the server 200 includes a processing unit 204, a network interface 206, a computer readable medium drive 207, an input/output device interface 220, a display 202, and an input device 224, all of which may communicate with one another by way of a communication bus. The network interface 206 may provide connectivity to one or more networks or computing systems, such as the network 106 of FIG. 1. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, etc. In some embodiments, the server 200 may include more (or fewer) components than those shown in FIG. 2. For example, some embodiments of the server 200 may omit the display 202 and input device 224, while providing input/output capabilities through one or more alternative communication channel (e.g., via the network interface 206).

The memory 210 may include computer program instructions that the processing unit 204 executes in order to implement one or more embodiments. The memory 210 generally includes RAM, ROM and/or other persistent or non-transitory memory. The memory 210 may store an operating system 214 that provides computer program instructions for use by the processing unit 204 in the general administration and operation of the server 200. The memory 210 may further include computer program instructions and other information for implementing aspects of the present disclosure. For example, in one embodiment, the memory 210 includes user interface software 212 that generates user interfaces (and/or instructions therefor) for display upon a computing device, e.g., via a navigation interface such as a web browser installed on the computing device. In addition, memory 210 may include or communicate with one or more auxiliary data stores, such as data store 120, which may correspond to any persistent or substantially persistent data storage, such as a hard drive (HDD), a solid state drive (SDD), network attached storage (NAS), a tape drive, or any combination thereof.

In addition to the user interface module 212, the memory 210 may include manifest generation software 216 that may be executed by the processing unit 204. In one embodiment, the manifest generation software 216 implements various aspects of the present disclosure, e.g., generating concealed manifests for client computing devices 116 that prevent or inhibit clients for automatically or manually blocking, skipping, or altering protected content portions. While the manifest generation software 216 is shown in FIG. 2 as part of the server 200, in other embodiments, all or a portion of the software may be implemented by alternative computing devices within the streaming content delivery system 110, such as virtual computing devices within a hosted computing environment a part of the computing devices 204.

Figure 3A:
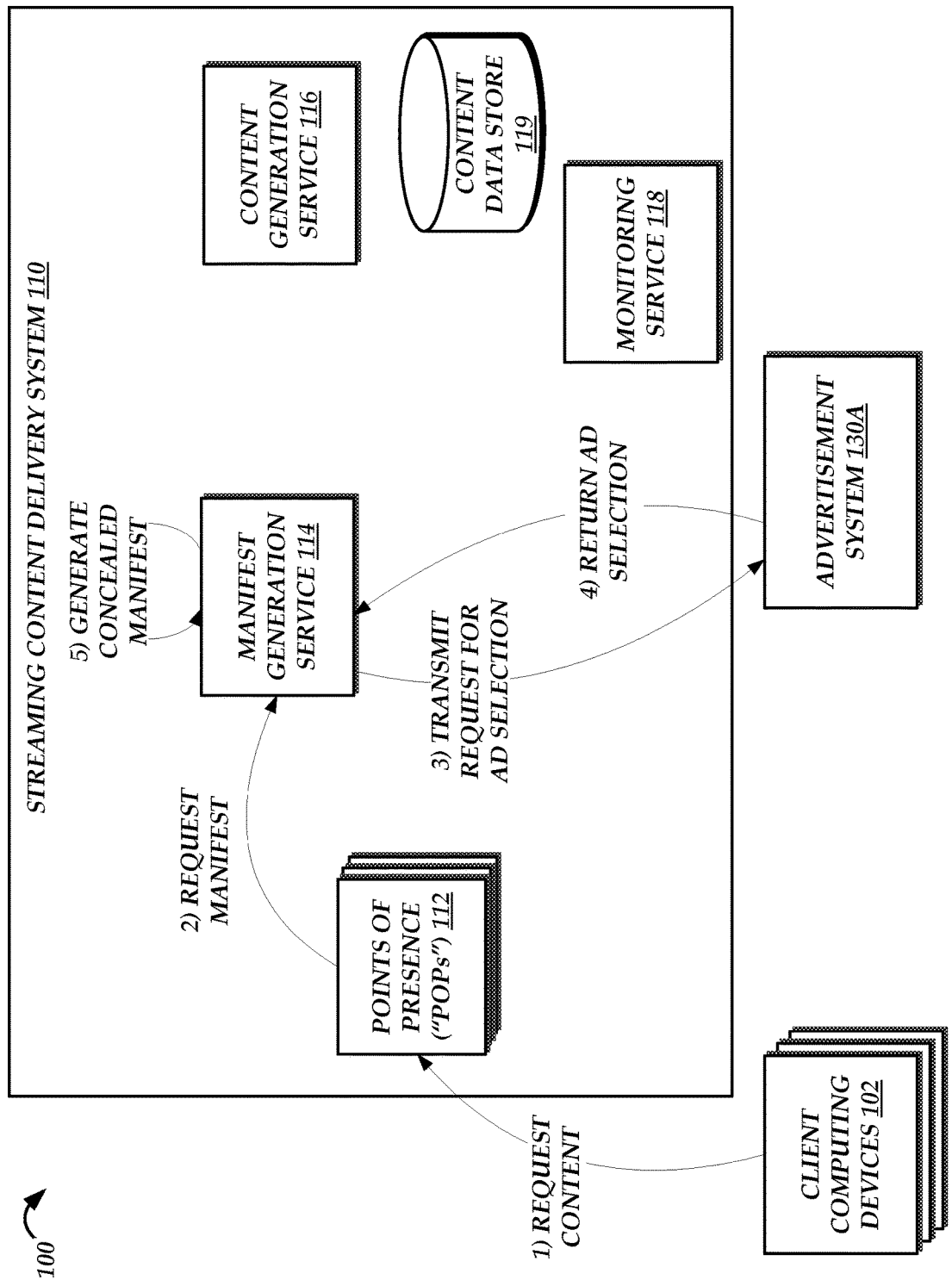
FIGS. 3A and 3B are block diagrams depicting illustrative interactions of the streaming content delivery system of FIG. 1 to generate a concealed manifest for a client, enabling the client to consume content while inhibiting removal or blocking or certain portions of the content.
Figure 3B:
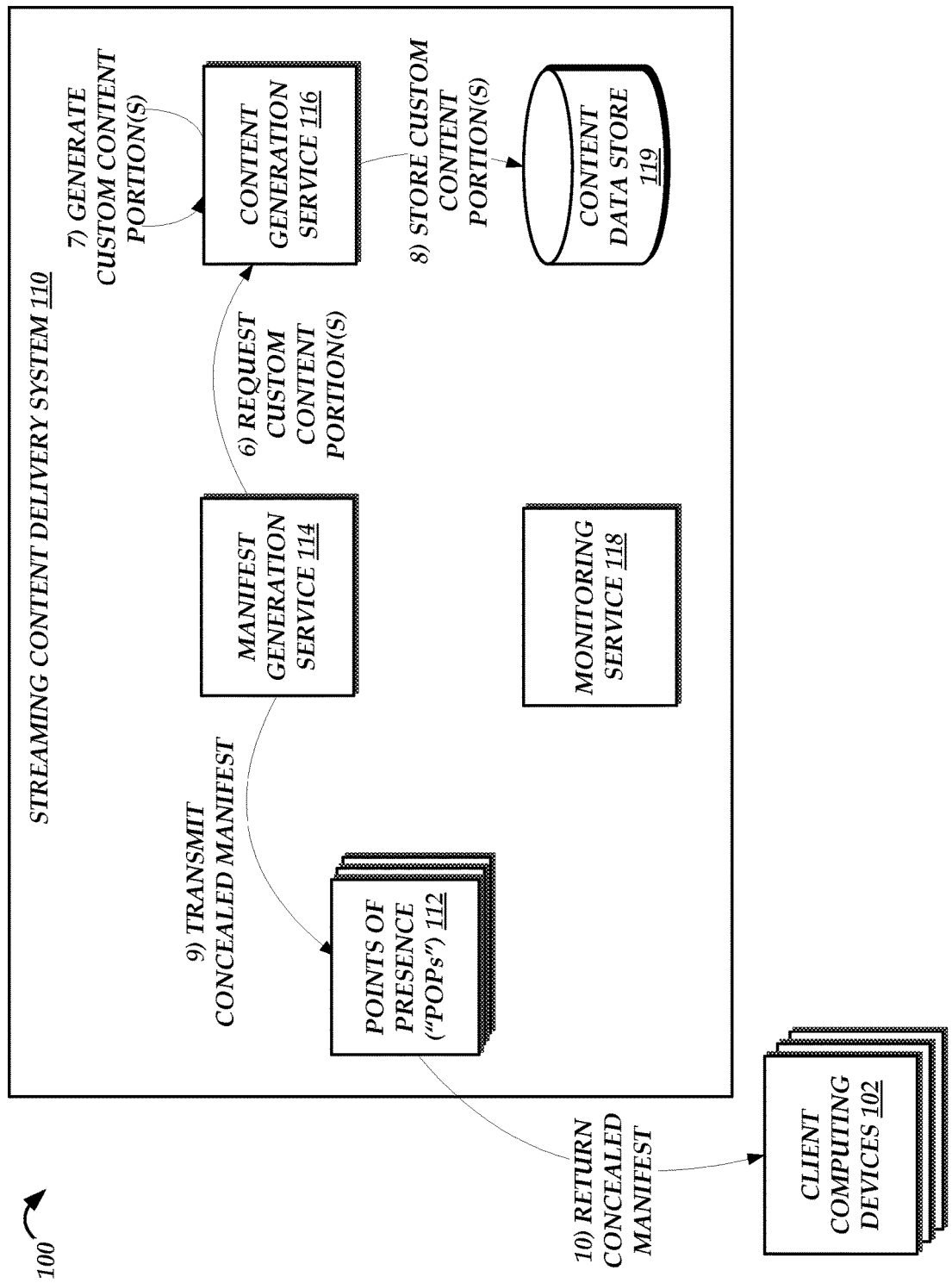

FIGS. 3A and 3B depict a set of illustrative interactions for providing a concealed manifest to a client computing device 102 to enable the device 102 to stream content from the streaming content delivery system 110 while preventing or inhibiting the device 102 from removing, modifying, or blocking portions ("protected" portions) of that content. While shown as two figures, the number of interactions between FIGS. 3A and 3B is maintained for consistency.

The interactions begin at (1) of FIG. 3A, where a client computing device 102 requests content from a POP 112 of the streaming content delivery system 110. The request may be generated by a client's use of the client computing device 102, such as by launching or interacting with an application for viewing streaming content, a web browser application, etc. The request can indicate at least a main content desired by the client, such as a television program, movie, video, audio program, etc. In some instances, the request can further indicate information regarding the client computing device 102 or a client utilizing the client computing device 102, such as configuration of the device 102, location of the device 102, an account of the device 102 or the client on the streaming content delivery system 110. As described below, this information may be utilized by the streaming content delivery system 110 and/or an advertisement system 130 to determine additional content to be provided to the client computing device 102, such as legal warnings, credits, dedications, or advertisements, any of which the streaming content delivery system 110 may wish to protect from automatic removal or modification by the client computing device 102 or manual skipping by a client of the device 102.

At (2), the receiving POP 112 requests a manifest from the manifest generation service 114. The manifest can generally correspond to a record of metadata regarding a content stream, such as the format of the stream, as well as a listing of content portions that, when played in sequence, form the content stream. Accordingly, the request transmitted by the POP 112 may include information received from the client computing device 102, such as the main content requested to be streamed, information regarding the client computing device 102, or information regarding a client of the device 102. The request transmitted by the POP 112 may further include additional information obtained by the POP 112, such as a time of day of the request, information associated with an account of the client of the device 102, etc.

As noted above, in addition to the main content requested by the client computing device 102, streaming content can also include one or more other types of content, such as legal warnings, credits, dedications, or advertisements. This content will generally be described herein as "additional content." In some instances, the manifest generation service 114 itself may determine what additional content is to be included within a content stream. For example, the manifest generation service 114 may include a specific legal warning within all content streams, or may maintain a set of rules that determine what additional content should be provided within a stream (e.g., based on criteria such as the main content requested, attributes of the request, attributes of the client computing device 102, etc.). In other instances, the manifest generation service 114 may interact with other components, such as advertisement system 130, to determine what additional content to include within the content stream. Because the additional content can be determined at the time that a manifest file is generated, the additional content can be targeted specifically to the client computing device 102 or the client of that device 102. For example, specific advertisements can be included within a content stream that are likely to be relevant to a client. For the purposes of description of FIG. 3A, it will be assumed that the manifest generation service 114 is configured to interact with an advertisement system 130A to determine at least one advertisement to include within a content stream as additional content.

Accordingly, at (3), the manifest generation service 114 transmits a request to the advertisement system 130A for selection of an advertisement to be included within a content stream, and thus identified within a manifest file delivered to the client computing device 102. In one embodiment, the request may be formatted according to the VAST specification, and may include any information regarding the request, such as information regarding the requested main content, attributes of the client computing device 102, attributes of the client of that device 102, etc. In response, at (4), the advertisement system 130A returns an indication of an advertisement to be included in the content stream as additional content, which may also indicate how the advertisement is to be inserted in the main content (e.g., at what times), information to be tracked regarding output of the advertisement, etc. Specific interactions for selecting advertisements are outside the scope of the present disclosure, and thus will not be discussed in detail.

At (5), the manifest generation service generates a concealed manifest, which identifies content portions corresponding to both the requested main content and any additional content (e.g., the advertisement selected by the advertisement system 130A). Illustratively, in order to generate a concealed manifest, the manifest generation service 114 may first identify what content is to be streamed to the client computing device (e.g., main content and any additional content) and the relative order of that content (e.g., as determined by the information provided by the advertisement system 130A or other information maintained at the manifest generation service 114). The manifest generation service 114 can then determine content portions that, when played in sequence, form the desired content stream. For example, where the manifest generation service 114 determines that a three minute advertisement should be streamed before then streaming a thirty minute television program, the manifest generation service 114 may generate a manifest that identifies content portions forming the three minute advertisement, as well as content portions that form the thirty minute television program. The manifest may also include metadata regarding the stream, such as a format of the content portions, length of each portion, overall duration of the stream, etc. In one embodiment, the manifest is formatted in accordance with the HTTP (hypertext transport protocol) live streaming protocol, or "HLS." Typically, manifests generated according to this protocol include identifiers for each content portion that correspond to actual files on a network-based system. For example, manifests may indicate a URI for each content portion that corresponds to a video file stored on a network-based storage device. Thus, by downloading and outputting these video files, a client can stream the content identified in the manifest. However, direct placement of actual identifiers within a manifest also provides an opportunity for client devices to selectively modify the manifest, or block downloading or output of specific content portions.

Thus, in accordance with embodiments of the present disclosure, the manifest generated by the manifest generation service can include a series of concealed identifiers, which may not directly identify files within the streaming content delivery system 110 and which may mask the contents of each content portion, such that it is unlikely or impossible for a client computing device 102 to determine the contents of a content portion based on the concealed identifier. A manifest utilizing concealed identifiers for content portions may generally be referred to herein as a concealed manifest. For example, rather than providing the actual identifier of each content portion, the manifest generation service 114 may encrypt the identifier, using an encryption key, to generate a concealed identifier. The encryption key can be kept from the client computing devices 102, such that clients are unable to determine the actual identifier for each content portion. However, the encryption key may be shared with the components of the streaming content delivery system 110, such that those components, on receiving a request for a content portion identified by a concealed identifier, may determine the actual content portion corresponding to a concealed identifier. Note that encryption of content identifiers is distinct from encryption of content portions themselves (which may occur, for example, under digital rights management ["DRM"] schemes). Encryption of content identifiers is intended to refer to the encryption of a resource locator for a content portion (e.g., a file name or path), and may thus alter how a client computing device 102 identifies the content portion within a request to the streaming content delivery system 110. In contrast, encryption of the content portion itself generally refers to an encryption of a particular file, and may thus alter how the content portion (once received) is read or output by the client computing device 102. Encrypted content identifiers may be utilized with or without encryption of individual content portions themselves. As noted above, other mechanisms (in addition or alternatively to encryption) may be utilized to generated concealed identifiers. For example, a concealed identifier for a given content portion may in some instance be determined by random selection, or by passing the actual identifier through a one-way hash algorithm.

Figure 5:
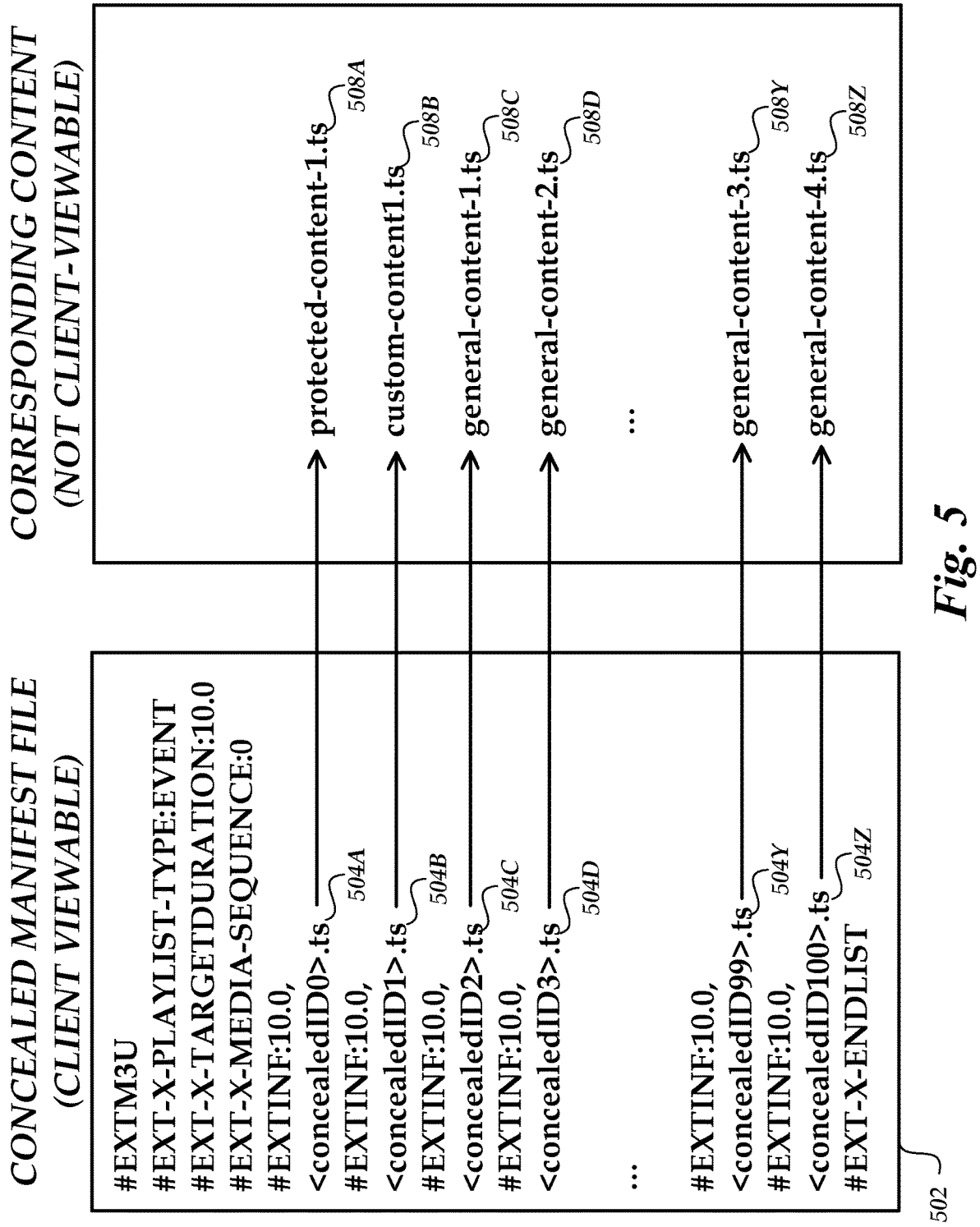
FIG. 5 is an illustrative graphical depiction or visualization of a concealed manifest that may be provided by the streaming content delivery system of FIG. 1, as well as content portions corresponding to the concealed portion identifiers indicated within the concealed manifest.

By way of illustration, FIG. 5 includes a visualization of a concealed manifest 502 that may be utilized in accordance with the present disclosure. As shown in FIG. 5, the concealed manifest 502 identifies a series of content portions (identified by concealed identifiers 504A-Z) that, when viewed, form streaming content. Each concealed identifier 504 can reflect a series of alphanumeric characters (or any other character usable by the client computing device 102) generated by the manifest generation system 110 (e.g., by encrypting an actual identifier of the content portion). Because the manifest 502 is viewable by a client computing device 102, the concealed identifiers are formed to prevent or inhibit the client computing device 102 from distinguishing between various types of content (e.g., main content versus advertisements, etc.). Thus, the various concealed identifiers may be formed according to the same algorithm (e.g., according to the same encryption scheme, etc.), and may refer to content portions that share similar or identical attributes (e.g., length, format, bitrate, etc.).

As shown in FIG. 5, each concealed identifier 504 corresponds to an actual identifier 508 for a content portion. These actual identifiers may reflect the name or location of a file (on the streaming content delivery system 110 or another network resource, such as the advertising system 130) corresponding to the content portion. While shown in FIG. 5 as simply a file name, concealed identifiers and/or actual identifiers may in some instances include any or all of a URI for a content portion. Because the actual identifiers of each content portion may reveal information regarding that content portion (e.g., the type of content within the content portion), the actual identifiers are generally withheld from the client computing device 102.

In some instances, in order to ensure that the concealed manifest 502 does not provide information about the types of content underlying the concealed identifiers 504, one or more of the content portions may be custom generated by the streaming content delivery service 110. For example, actual identifier 508B refers to "custom-content1.ts," which may be generated as a combination of protected content (e.g., an advertisement or disclaimer) and main content (e.g., a television program). Illustratively, custom content may be generated at transitions between content types or in any other instance in which an existing content portion would not conform to the other content portions within the concealed manifest 502. For example, where the final content portion of an advertisement would consume only 5 seconds, but where other content portions in a manifest generally consume 10 seconds, a custom content portion can be generated by the streaming content delivery system 110 that combines the final 5 seconds of the advertisement with an initial five seconds of a main content (or other additional content).

Returning to the interactions of FIGS. 3A and 3B, after generating a concealed manifest (e.g., corresponding to the example manifest 502 of FIG. 5), the manifest generation service 114 can interact with the content generation service 116 to ensure that any content portions identified (e.g., via concealed identifiers) within the manifest are available for transmission to a client computing device 102. Specifically, at (6), the manifest generation service 114 can request that the content generation service 116 create any custom content portions identified in the concealed manifest but not yet stored within the content data store 119 (or other network data store). The request may include, for example, desired content to use in creating a custom content portion (e.g., 5 seconds of a specific advertisement, 5 seconds of a specific main content), as well as parameters for the custom content portion (e.g., bitrate, encoding type, resolution, etc.) At (7), the content generation service 116 can utilize information of the request to generate custom content portions. Illustratively, the content generation service 116 may retrieve each desired content (e.g., advertisements, main content, etc.) and re-encode that desired content to form the requested custom content portions. Thereafter, at (8), the content generation service 116 stores the custom content portions into the content data store 119 for later retrieval by the POPs 112 and transmission to the client computing devices 102, as described in more detail below with reference to FIG. 4.

In addition, at (9), the manifest generation service 114 returns the concealed manifest to a POP 112. In some instances, the manifest generation service 114 may further return information regarding the concealed manifest, such as the encryption used to generate concealed identifiers within the manifest or a key for that encryption. In other instances, such as where a standard encryption and key are used, that information may be omitted from interaction (9). In either instance, at (10), the POP 112 returns the concealed manifest to the client computing device 102, enabling the client computing device 102 to stream the content identified within the manifest, while inhibiting or preventing the client computing device 102 from distinguishing between the different types of content identified within the manifest based on the identifiers provided therein.

While the interactions of FIGS. 3A and 3B are described above sequentially, it is contemplated that some or all of the interactions may repeatedly occur, and that these interactions may occur at least in part concurrently. For example, the manifest generation service 114 may concurrently or simultaneously transmit a concealed manifest to a POP 112 and request that custom content portions within a concealed manifest be created. As a further example, the streaming content delivery system 110 may be configured to deliver multiple manifests for a given item of streaming content, or to deliver a single manifest as multiple transmissions over time. Thus, prior to each point in which a new manifest or section of a manifest is transmitted to the client computing device 102, the manifest generation service 114 may determine a new set of content portions to be identified within the new manifest or section. In some instances, the new set of portions may vary based on monitored information regarding the streaming content (e.g., as obtained from the monitoring service 118). For example, where monitoring information indicates that a client computing device 102 did not output a protected portion (or, potentially, that the protected portion was never requested by the client computing device 102), the manifest generation service 114 may identify the protected portion (or another additional content portion) in a new manifest or manifest section. Thus, where a user "skips" over a protected portion (e.g., an advertisement) in an effort not to view the portion, a new advertisement or protected portion may be identified in the manifest. In some instances, new manifests may identify only protected content (e.g., and not other content, such as main content) until a client computing device 102 outputs the protected content, at which point additional manifests (or manifest sections) can be provided included non-protected content.

While the descriptions of FIGS. 3A and 3B generally refer to the use of encryption to convert actual identifiers of content portions into concealed identifiers, the manifest generation service 114 may in some instances utilize other processes to determine concealed identifiers. For example, the manifest generation service 114 may utilize any of a variety of obfuscation techniques, coding, or ciphers to transform an actual identifier into a concealed identifier. In some instances, the manifest generation service 114 may simply assign random identifiers to content portions as concealed identifiers. The manifest generation service 114 may then transmit a mapping of actual identifiers to the assigned concealed identifiers to components of the streaming content delivery system 110, as required. In some instances, the assigned concealed identifiers may be globally unique, such that a component (e.g., a POP 112) may determine an actual identifier based solely on a concealed identifier. In other instances, the concealed identifiers may be client-specific or session-specific, such that the same concealed identifier (e.g., "ID1.ts") can be utilized for multiple clients, and that the actual identifiers for a requested content item vary based on the source of the request (e.g., based on session identifier, client network address, etc.). Generally, the use of one or more specific encryption algorithms and keys to generate all concealed identifiers may be preferably, as only those algorithms and keys need be propagated between components of the streaming content delivery system 110 to enable concealed identifiers to be converted into actual identifiers.

Moreover, while the interactions of FIGS. 3A and 3B are described with respect to a single series of content portions, embodiments of the present disclosure may enable the use of alternative series of content portions, each of which form a different version of streaming content. For example, a first series of content portions may present streaming content at a first quality level, a second series at a second quality level, etc. The various series may be identified in a single manifest or multiple manifests provided to the client computing device 102. In some instances, the client computing device 102 may switch between outputting content portions of different series to account for the state of the device 102 (e.g., to account for slow communications between the device 102 and the streaming content delivery system 110).

Figure 4:
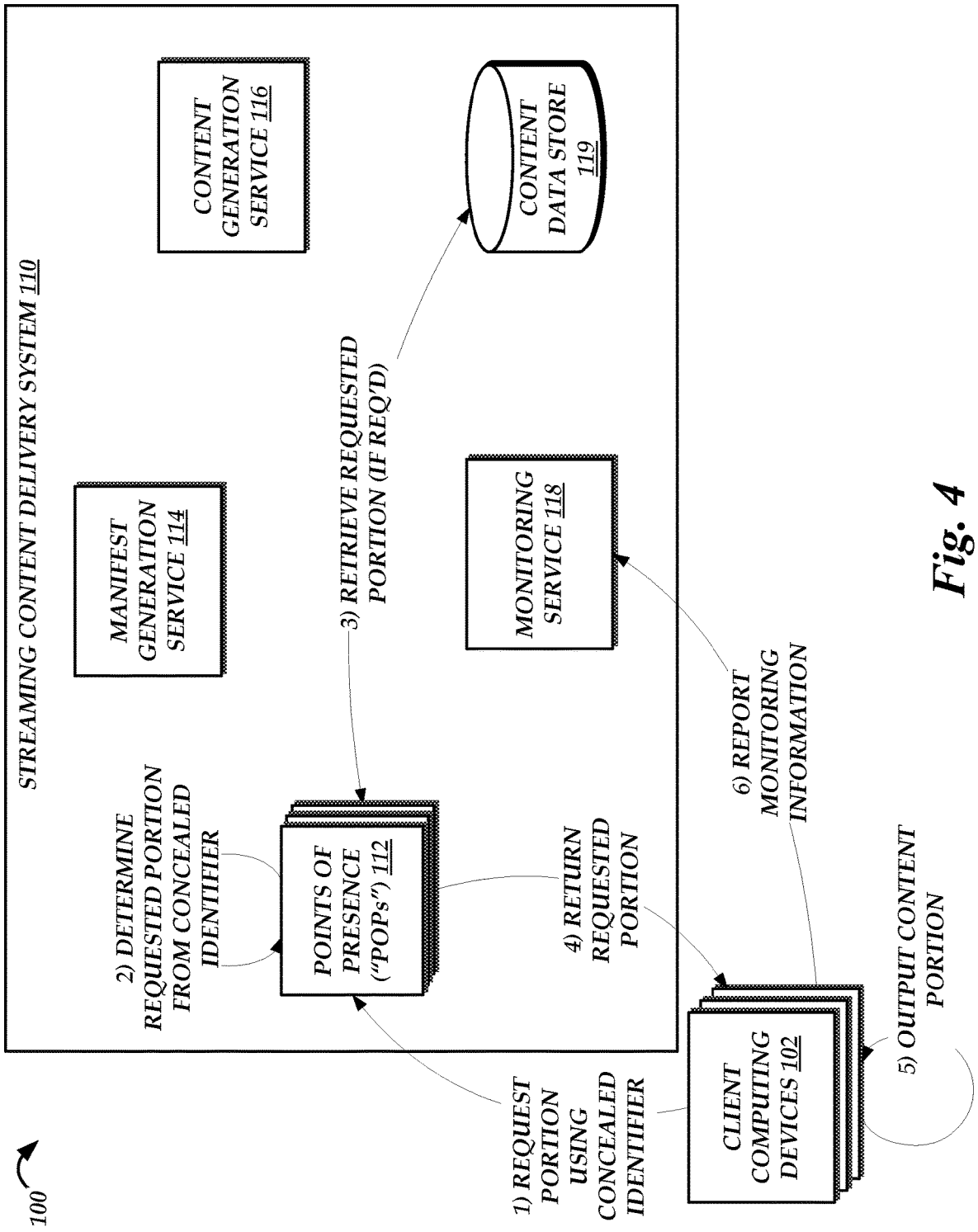
FIG. 4 is a block diagram depicting illustrative interactions of the streaming content delivery system of FIG. 1 to provide content to a client computing device based on a concealed manifest.

FIG. 4 depicts a set of illustrative interactions for utilizing a concealed manifest file, including concealed identifiers for content items forming a content stream, to output that content stream on a client computing device 102. The interactions begin at (1), where a client computing device 102 requests a content portion from a POP 112 of the streaming content delivery system 110, using a concealed identifier for the portion. The request may be automatically generated by the client computing device 102 (e.g., by a web browser or other application) based on processing a manifest previously obtained from the streaming content delivery system 110. On receiving the request, the POP 112 determines an actual identifier of the requested portion based on the concealed identifier. Illustratively, where the concealed identifiers are generated by encrypting an actual identifier with an encryption key, the POP 112 may utilize that key to decrypt the concealed identifier, and thus determine an actual identifier of the requested portion. Where the concealed identifiers are generated using other conversions (e.g., random assignment), the POP 112 may utilize information provided by the manifest generation system 114, such as a mapping of concealed identifiers to actual identifiers, to determine which actual identifier corresponds to the requested portion.

At (3), the POP 112 retrieves the requested portion from the content data store 119, if required. Illustratively, retrieval of the content portion may only be required if the content portion is not previously stored at a cache of the POP 112. In the instance that the content portion is stored at the POP 112, interaction (3) may not be required. While retrieval of a content portion is shown with respect to the content data store 119, POPs 112 may additionally or alternatively retrieve content from other data sources, such as the advertisement systems 130 (not shown in FIG. 4). Advantageously, because retrieval can occur based on an actual identifier of the content portion (rather than a concealed identifier), the same data can be utilized to service requests for the content portion from many different client computing device 102, regardless of whether the concealed identifier provided to each client computing device 102 is the same. Thus, the streaming content delivery system 110 is enabled to arbitrarily change the process in which concealed identifiers are created, without requiring recreation of the content portions themselves. Moreover, because each POP 112 can be enabled to determine the actual identifier for a content portion based on a concealed identifier, the client computing devices 102 may interact with any POP 112, or with multiple POPs 112, to obtain content portions.

After obtaining the requested content portion, at (4), the POP 112 returns the content portion to the client computing device 102, which may output the content portion at (5). The client may further report monitoring information regarding output of the content portion to the monitoring service 118 at (6). While not shown in FIG. 4, the POP 112 or other components of the streaming content delivery system 110 may additionally or alternatively report monitoring information to the monitoring service 118. The interactions of FIG. 4 may be repeated, or implemented, concurrently, to enable a client computing device to output content portions identified with concealed identifiers within a manifest, and thus to output a content stream while being inhibited or prevented from modifying, removing, or blocking portions of the content stream.

Figure 6:
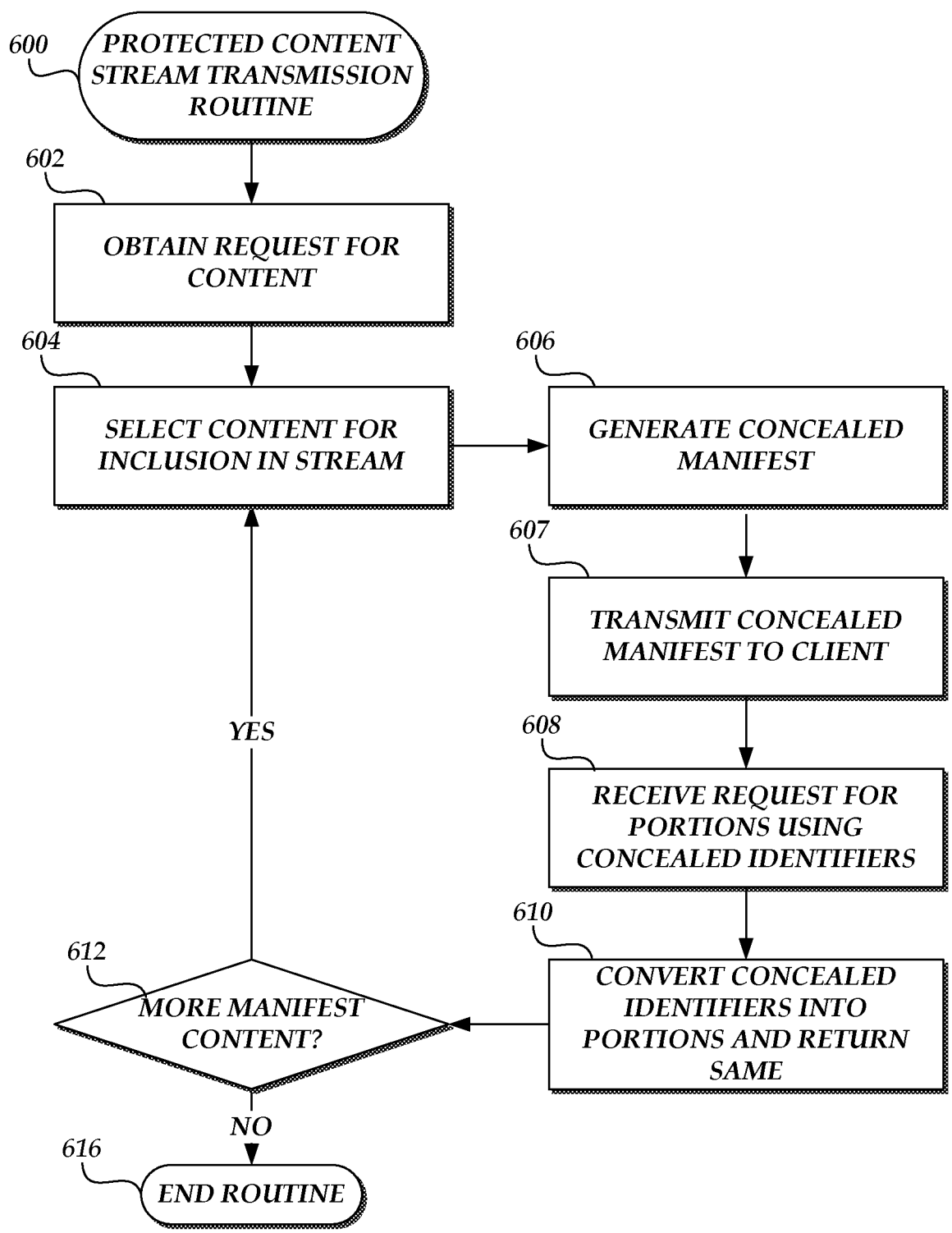
FIG. 6 is a flow chart depicting an illustrative routine for providing content with protected portions by use of a concealed manifest.

With reference to FIG. 6, one illustrative routine 600 for providing streaming content including protected content portions is depicted. The routine 600 may be carried out, for example, by the content delivery system 110 of FIG. 1. The routine 600 begins at block 602, where the content delivery system 110 obtains a request for streaming content from a client computing device 102. The request may be generated by a client's use of the client computing device 102, such as by launching or interacting with an application for viewing streaming content, a web browser application, etc. The request can indicate at least a main content desired by the client, such as a television program, movie, video, audio program, etc. In some instances, the request can further indicate information regarding the client computing device 102 or a client utilizing the client computing device 102, such as configuration of the device 102, location of the device 102, an account of the device 102 or the client on the streaming content delivery system 110.

At block 604, the streaming content delivery system 110 selects content to be included in a content stream. Illustratively, the selected content can include main content (e.g., that requested by the client computing device 102) as well as additional content (e.g., legal disclaimers, advertisements, etc.). In some instances, the streaming content delivery system 110 may determine additional content by interaction with third party or external systems, such as advertisement systems 130. Further, the streaming content delivery system 110 may determine the content for inclusion based on information regarding the client computing device 102. As will be described below, in some instances, block 604 may be implemented repeatedly, and the content selected for inclusion in the stream may vary based on whether the client computing device 102 has already output protected content (e.g., such that if protected content has been skipped over, it is re-included in the content stream).

At block 606, the streaming content delivery system 110 generates a concealed manifest for the content stream, including concealed identifiers of a set of content portions that form the content stream. Illustratively, the content portions can correspond to portions of the main content as well as portions of any additional content (which may be protected content). In some instances, such as where a portion of additional content would be of a dissimilar length to other portions in the manifest, the content portions may correspond to combinations of main content and additional content. In instances where portions are not yet available at the streaming content delivery system 110, the streaming content delivery system 110 may cause the portions to be generated (e.g., by use of the content generation service 116). Implementation of block 606 may further include generation of a set of concealed identifiers for each content portion. Illustratively, the streaming content delivery system 110 may pass an actual identifier of each portion through an encryption algorithm to generate an encrypted identifier which functions as a concealed identifier. Each concealed identifier may then be included as part of the concealed manifest.

At block 607, the streaming content delivery system 110 transmits the concealed manifest, including a plurality of content portions identified by concealed identifiers, to the client computing device 102. The client computing device 102 may then utilize the concealed manifest to request the content portions using the concealed identifiers therein (e.g., utilizing executable code provided as part of a web page or application executing on the streaming content delivery system 110). Accordingly, at block 608, the streaming content delivery system 110 receives requests (or a request) for content portions (or a portion) identified within the concealed manifest by use of a concealed identifier.

At block 610, the streaming content delivery system 110 converts the concealed identifiers received in the requests to an actual identifier, and returns the identified content portion to the client computing device 102. Illustratively, where the concealed identifiers were generated at block 606 by encrypting an actual identifier of the content portion, block 610 may include decrypting the concealed identifier of the content portion to result in the actual identifier. The actual identifier may then be utilized to obtain the content portion, and return the content portion to the client computing device 102 for output.

At block 612, implementation of the routine 612 can vary based on whether additional manifest content is to be transmitted to the client. Illustratively, where a manifest identifying all content portions has been transmitted to the client computing device 102, the routine 600 may end at block 616. Where the content stream to be provided to the client computing device 102 includes additional content portions not yet identified within a manifest to the client computing device 102, the routine 600 continues to block 604, where the streaming content delivery system 110 may again determine the content portions to be included in the stream. As noted above, these portions may vary between implementation of block 604 based on monitoring information regarding the client computing device 102. For example, where monitoring information indicates that the client computing device 102 has not output protected content (e.g., because the client "skipped over" that content), the streaming content delivery system 110 may reinsert the protected content at a later location in the manifest, or may exclude other content (e.g., main content) from the manifest until the monitoring information indicates that the protected content has been viewed. The routine 600 may then continue until all content portions have been identified to the client computing device 102, and at which point the routine 600 ends at block 616.

While the routine 600 is described sequentially, implementation of various blocks of the routine 600 may occur at least in part concurrently, and may be achieved by different components within the streaming content delivery system 110. For example, a manifest generation service 14 may implement blocks 602 through 607, while POPs 112 may implement blocks 608 and 610. Advantageously, where each component is aware of the process utilized to convert actual identifiers of content portions to concealed identifiers, little or no information need be exchanged between the components to implement the routine 600 in a distributed manner.

While the embodiments described herein generally determine the content portions to be transmitted to a client computing device 102 at the time that a manifest (or section of a manifest) is created, other embodiments are contemplated within the scope of the present disclosure. Accordingly, in some instances the streaming content delivery system 110 may modify a mapping of concealed identifiers to actual identifiers at the time that individual content portions are requested. For example, where a client computing device 102 uses a concealed identifier to request a first content portion (e.g., main content), but monitoring information indicates that the client computing device 102 has not yet viewed a second content portion (e.g., an advertisement), the streaming content delivery system 110 may respond to the request by providing the second content portion, even when the concealed identifier would generally be converted to an actual identifier for the first content. In some instances, the streaming content delivery system 110 may not maintain any information mapping concealed identifiers to actual identifiers, but may instead make such determinations on an ad hoc basis, as requests for content portions identified with concealed identifiers are received. For example, the streaming content delivery system 110 may return the same set of concealed identifiers to every client computing device, but modifying what content portions are returned to each client computing device in response individual requests. Such ad hoc matching of concealed identifiers to content portions may be beneficial in smaller systems, in order to provide high flexibility and to limit the complexity of generating manifests.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   one or more computing devices configured to execute computer-executable instructions stored in a data store, wherein the computer-executable instructions, when executed, cause the one or more computing devices to:
   obtain a request from a client computing device to receive streaming content, wherein the streaming content is represented by a plurality of content portions that are identified by a first set of identifiers, and wherein the first set of identifiers comprises identifiers to at least two different identification schemes; and
   generate a concealed manifest for the streaming content, wherein the concealed manifest includes a set of concealed identifiers that utilize a single identification scheme common among the set of concealed identifiers to identify the plurality of content portions, wherein the concealed identifiers correspond to identifiers within the first set of identifiers, and wherein the concealed identifiers within the concealed manifest, in their concealed form and without modification of the concealed identifiers into an unconcealed form, indicate an order of output of the plurality of content portions to form the streaming content; and transmit the concealed manifest to the client computing device.

2. The system of claim 1, wherein the plurality of content portions comprise i) a first set of content portions provided by a first party and identified according to a first identification scheme of the at least two different identification schemes and ii) a second set of content portions provided by a second party and identified according to a second identification scheme of the at least two different identification schemes.

3. The system of claim 1, wherein individual concealed identifiers of the set of concealed identifiers represent encrypted forms of the corresponding identifiers within the first set of identifiers.

4. The system of claim 1, wherein the concealed identifiers of the set of concealed identifiers represent randomly generated identifiers.

5. The system of claim 1, wherein individual concealed identifiers of the set of concealed identifiers represent outputs of a hash algorithm applied to a corresponding identifier within the first set of identifiers.

6. The system of claim 1, wherein the computer-executable instructions, when executed, further cause the computing devices to generate the plurality of content portions from at least two sets of content portions that have varying attributes, and wherein to generate the plurality of content portions, the instructions cause the computing devices to reencode the at least two sets of content portions to normalize attributes of the plurality of content portions.

7. The system of claim 1, wherein the client computing device is configured to transmit one or more requests for individual content portions of the plurality of portions, the one or more requests identifying the individual content portions in the requests using the concealed identifiers for the individual content portions, and wherein a server computing device associated with the one or more computing devices is configured to identify identifiers of the first set of identifiers that correspond to the concealed identifiers for the individual content portions as included in the one or more requests, and to return the individual content portions identified by the identifiers of the first set of identifiers to the client computing device in response to the one or more requests from the client computing device.

8. A computer-implemented method comprising:
obtaining a request from a client computing device to receive streaming content, wherein the streaming content is represented by a plurality of content portions that are identified by a first set of identifiers;
generating a concealed manifest for the streaming content, wherein the concealed manifest includes a set of concealed identifiers that utilize a single identification scheme common among the set of concealed identifiers to identify the plurality of content portions, wherein each concealed identifier corresponds to an identifier within the first set of identifiers, and wherein the concealed identifiers within the concealed manifest, in their concealed form and without modification of the concealed identifiers into an unconcealed form, indicate an order of output of the plurality of content portions to form the streaming content; and
transmitting the concealed manifest to the client computing device, wherein the client computing device is configured to transmit one or more requests for individual content portions of the plurality of portions, the one or more requests identifying the individual content portions in the requests using the concealed identifiers for the individual content portions.

9. The computer-implemented method of claim 8, wherein the plurality of content portions represents a first plurality of content portions, and wherein the method further comprises:
obtaining monitoring information regarding output of the streaming content on the client computing device;
identifying a second plurality of content portions to be included in the streaming content based at least in part on the monitoring information;
generating an additional section of the concealed manifest at least partly by generating concealed identifiers for the second plurality of content portions utilizing the common identification scheme; and
transmitting the additional section of the concealed manifest to the client computing device.

10. The computer-implemented method of claim 8 wherein generating the concealed manifest comprises generating the set of concealed identifiers by encrypting the first set of identifiers.

11. The computer-implemented method of claim 8 wherein generating the concealed manifest comprises generating the set of concealed identifiers by randomly selecting concealed identifiers of the set of concealed identifiers.

12. The computer-implemented method of claim 8, wherein a server computing device is configured to identify identifiers of the first set of identifiers that correspond to the concealed identifiers for the individual content portions as included in the one or more requests, and to return the individual content portions identified by the identifiers of the first set of identifiers to the client computing device in response to the one or more requests from the client computing device.

13. The computer-implemented method of claim 9, wherein the second plurality of content portions correspond to a main content, and wherein identifying the second plurality of content portions to be included in the streaming content based at least in part on the monitoring information comprises determining that the monitoring information indicates that the client computing device has output a particular content portion of the first plurality of content portions.

14. The computer-implemented method of claim 9, wherein the second plurality of content portions corresponds to a subset of the first plurality of content portions, and wherein identifying the second plurality of content portions to be included in the streaming content based at least in part on the monitoring information comprises determining that the monitoring information indicates that the client computing device has not output a particular content portion of the first plurality of content portions.

15. The computer-implemented method of claim 9 further comprising generating at least one of the plurality of content portions by re-encoding content to share an attribute with the remaining content portions of the plurality of content portions.

16. One or more non-transitory computer-readable media comprising computer-executable instructions that, when executed by a computing system, cause the computing system to:

obtain a request from a client computing device to receive streaming content, wherein the streaming content is represented by a plurality of content portions that are identified by a first set of identifiers;

generate a concealed manifest for the streaming content, wherein the concealed manifest includes a set of concealed identifiers that utilize a single identification scheme common among the set of concealed identifiers to identify the plurality of content portions, wherein each concealed identifier corresponds to an identifier within the first set of identifiers, and wherein the concealed identifiers within the concealed manifest, in their concealed form and without modification of the concealed identifiers into an unconcealed form, indicate an order of output of the plurality of content portions to form the streaming content; and transmit the concealed manifest to the client computing device, wherein the client computing device is configured to transmit one or more requests for individual content portions of the plurality of portions, the one or more requests identifying the individual content portions in the requests using the concealed identifiers for the individual content portions.

17. The one or more non-transitory computer-readable media of claim 16, wherein the plurality of content portions represents a first plurality of content portions, and wherein the instructions further cause the computing system to:

obtain monitoring information regarding output of the streaming content on the client computing device;

identify a second plurality of content portions to be included in the streaming content based at least in part on the monitoring information;

generate an additional section of the concealed manifest at least partly by generating concealed identifiers for the second plurality of content portions utilizing the common identification scheme; and transmit the additional section of the concealed manifest to the client computing device.

18. The one or more non-transitory computer-readable media of claim 16, wherein the instructions further cause the computing system to generate at least one of the plurality of content portions by re-encoding content to share an attribute with the remaining content portions of the plurality of content portions.

19. The one or more non-transitory computer-readable media of claim 16, wherein to generate the concealed manifest, the instructions cause the computing system to generate the set of concealed identifiers by encrypting the first set of identifiers.

20. The one or more non-transitory computer-readable media of claim 16, wherein to generate the concealed manifest, the instructions cause the computing system to generate the set of concealed identifiers by randomly selecting concealed identifiers within the set of concealed identifiers.

21. The one or more non-transitory computer-readable media of claim 16, wherein a server computing device is configured to identify identifiers of the first set of identifiers that correspond to the concealed identifiers for the individual content portions as included in the one or more requests, and to return the individual content portions identified by the identifiers of the first set of identifiers to the client computing device in response to the one or more requests from the client computing device.

22. The one or more non-transitory computer-readable media of claim 17, wherein the second plurality of content portions correspond to a main content, and wherein to identify the second plurality of content portions to be included in the streaming content based at least in part on the monitoring information, the instructions cause the computing system to determine that the monitoring information indicates that the client computing device has output a particular content portion of the first plurality of content portions.

23. The one or more non-transitory computer-readable media of claim 17, wherein the second plurality of content portions corresponds to a subset of the first plurality of content portions, and wherein to identify the second plurality of content portions to be included in the streaming content based at least in part on the monitoring information, the instructions cause the computing system to determine that the monitoring information indicates that the client computing device has not output a particular content portion of the first plurality of content portions.

* * * * *